United States Patent
Smith et al.

(10) Patent No.: US 7,268,293 B2
(45) Date of Patent: Sep. 11, 2007

(54) SURFACE COATING OF LAPPED INSULATION TAPE

(75) Inventors: James D B Smith, Monroeville, PA (US); Gary Stevens, Surrey (GB); John W Wood, Winter Springs, FL (US)

(73) Assignee: Siemen Power Generation, Inc., Orlando, FL (US)

( * ) Notice: Subject to any disclaimer, the term of this patent is extended or adjusted under 35 U.S.C. 154(b) by 85 days.

(21) Appl. No.: 11/106,844

(22) Filed: Apr. 15, 2005

(65) Prior Publication Data

US 2005/0274540 A1    Dec. 15, 2005

Related U.S. Application Data

(60) Provisional application No. 60/580,023, filed on Jun. 15, 2004.

(51) Int. Cl.
*H01B 7/00*   (2006.01)
*H01B 7/34*   (2006.01)

(52) U.S. Cl. ............... 174/36; 174/110 R; 174/120 R; 174/120 C; 174/120 SC

(58) Field of Classification Search ............ 174/110 R, 174/113 R, 117 R, 117 F, 117 FF, 120 R, 174/120 C, 120 FP, 120 SC; 310/42, 43, 310/45

See application file for complete search history.

(56) References Cited

U.S. PATENT DOCUMENTS

| | | | | |
|---|---|---|---|---|
| 3,866,316 A | * | 2/1975 | Takechi et al. ............... | 29/605 |
| 4,001,616 A | * | 1/1977 | Lonseth et al. ............... | 310/45 |
| 4,160,926 A | * | 7/1979 | Cope et al. ................... | 310/215 |
| 4,400,226 A | * | 8/1983 | Horrigan ....................... | 156/56 |
| 4,427,740 A | * | 1/1984 | Stackhouse et al. ......... | 428/324 |
| 4,634,911 A | * | 1/1987 | Studniarz et al. ............ | 310/215 |
| 4,760,296 A | * | 7/1988 | Johnston et al. .............. | 310/45 |
| 4,806,806 A | * | 2/1989 | Hjortsberg et al. ........... | 310/45 |
| 5,723,920 A | * | 3/1998 | Markovitz et al. ............ | 310/42 |
| 5,801,334 A | * | 9/1998 | Theodorides ......... | 174/120 SR |
| 5,904,984 A | | 5/1999 | Smith et al. | |
| 5,982,056 A | * | 11/1999 | Koyama et al. .............. | 310/43 |
| 6,069,430 A | | 5/2000 | Tsunoda et al. .............. | 310/180 |
| 6,130,495 A | * | 10/2000 | Schulten et al. ............. | 310/196 |
| 6,130,496 A | * | 10/2000 | Takigawa et al. ........... | 310/196 |
| 6,140,590 A | * | 10/2000 | Baumann et al. ........ | 174/137 B |
| 6,190,775 B1 | | 2/2001 | Smith et al. | |
| 6,238,790 B1 | | 5/2001 | Smith et al. | |
| 6,288,341 B1 | * | 9/2001 | Tsunoda et al. ......... | 174/137 B |
| 6,821,672 B2 | | 11/2004 | Zguris | |

FOREIGN PATENT DOCUMENTS

| | | | |
|---|---|---|---|
| EP | 0 266 602 A | * | 5/1988 |
| EP | 0 266 602 A1 | | 5/1988 |
| EP | 1 486 997 A1 | | 12/2004 |
| JP | 2005-06389 A | * | 1/2005 |
| WO | WO95/02504 A1 | | 1/1995 |
| WO | WO 00/56127 A1 | | 9/2000 |
| WO | WO 2004/006271 A1 | | 1/2004 |

* cited by examiner

*Primary Examiner*—William H. Mayo, III

(57) ABSTRACT

An electrically insulated object 13 with a heat conduit at the interface between the layers of insulating tape 16. The tape 16 has been, surface coated with a high thermal conductivity (HTC) material, so that the interface between the layers of tape 23 provides a pathway for the heat to reach the environment 24. The radiation of heat through the tape layers is also increased by the surface coatings.

21 Claims, 3 Drawing Sheets

SURFACE COATING OF LAPPED INSULATION TAPE

CROSS-REFERENCE TO RELATED APPLICATIONS

This application claims priority to U.S. provisional 60/580,023, filed Jun. 15, 2004, by Smith, et al., which is incorporated herein by reference.

FIELD OF THE INVENTION

The field of the invention relates to the surface coating of electrical insulation tapes.

BACKGROUND

With the use of any form of electrical appliance, there is a need to electrically insulate conductors. With the push to continuously reduce the size and to streamline all electrical and electronic systems, there is a corresponding need to find better and more compact insulators and insulation systems.

Good electrical insulators, by their very nature, also tend to be good thermal insulators, which is undesirable. Thermal insulating behavior, particularly for air-cooled electrical equipment and components, reduces the efficiency and durability of the components as well as the equipment as a whole. It is desirable to produce electrical insulation systems which have maximum electrical insulation and minimal thermal insulation characteristics.

Electrical insulation often appears in the form of tapes, which themselves have various layers. Common to these types of tapes is a paper layer that is bonded at an interface to a fiber layer, both layers tending to be impregnated with a resin. A favored type of insulation material is a mica-tape. Improvements to mica tapes include catalyzed mica tapes as taught in U.S. Pat. No. 6,103,882. The mica-tape may be wound around conductors to provide extremely good electrical insulation. An example of this is shown in FIG. 1. Illustrated here is a coil 13, comprising a plurality of turns of conductors 14, which in the example illustrated here are bakelized coils. The turn insulation 15 is prepared from a fibrous sheet or strip which may be impregnated with a resin. Ground insulation for the coil is provided by wrapping one or more layers of composite mica tape 16 about the turn 14. Such composite tape may be a paper, or a felt of laid down small mica flakes. The composite may also comprise a pliable backing sheet 18 of, for example, glass fiber cloth or polyethylene glycol terephthalate mat, having a layer of mica, usually in the form of flakes 20, bonded thereto by a liquid resinous binder. Generally, a plurality of layers of the composite tape 16 are wrapped about the coil depending upon voltage requirements. To impart better abrasion resistance and to secure a tighter insulation, a wrapping of an outer tape 21 of a tough fibrous material, for example, glass fiber, or the like is applied to the coil.

Generally, multiple layers of the mica tape 16 are wrapped about the coil with sixteen or more layers generally used for high voltage coils. Unfortunately, this amount of insulation only further adds to the complications of dissipating heat. What is needed is electrical insulation that can conduct heat higher than that of conventional methods, but that does not compromise the electrical insulation and other performance factors. Other problems with the prior art also exist, some of which will be apparent upon further reading.

SUMMARY OF THE INVENTION

With the foregoing in mind, methods and apparatuses consistent with the present invention, which inter alia facilitates the surface coating of insulation tapes that are lapped around an object in a consistent manner such that the interface between the tape layers acts as a thermal conduit. The surface coating is of a high thermal conductivity (HTC) material that aids in the phonon transport along the interface.

The HTC material may be of a variety of types, embodiments of which include the general categories of a direct surface coating, an HTC loaded resinous coatings or layers, and a substrate layer loaded with HTC materials. Direct surface coatings include DLCs and various oxides, carbides and nitrides. HTC loaded resinous layers include HTC materials such as nano, meso and micro fillers with organic and inorganic surface coatings. Substrates loaded with HTC materials include mica, glass and films such as polymers and polyamides. The thickness of these coatings and layers can vary from nanometers for DLCs, to fractions of a mil for resins to one or more for loaded substrates.

These and other objects, features, and advantages in accordance with the present invention are provided in particular embodiments by an insulation taped lapped around an electrical object that comprises an insulation tape that is surface coated with a high thermal conductivity layer. At least a top and bottom surface of the tape are coated, however, in particular embodiments, the top, bottom and side surfaces of the tape are coated. Side surface coating is particularly preferred when tapes are lapped in an overlapping manner. An electrical object is lapped by the insulation tape, where the insulation tape provides electrical insulation to the electrical object, and where the electrical object produces heat, and the heat travels through the insulation tape to the interface between the layers of tape, and where the high thermal conductivity layer acts to rapidly disperse heat along the interface and into the next lap.

In some embodiments, the high thermal conductivity layer is a direct surface coating approximately 20-200 nm in thickness. The direct surface coating may be a diamond like coating, or at least one of $Al_2O_3$, AlN, $MgO_2$, ZnO, BN, $Si_3N_4$, SiC and $SiO_2$ with mixed stoichiometric and non-stoichiometric combinations. In other embodiments, the high thermal conductivity layer is a resinous coating of is approximately 0.05-1.0 mils. In still other embodiments the high thermal conductivity layer is a thin substrate layer loaded with high thermal conductivity materials and is approximately 0.5-3.0 mils in thickness. Where the substrate layer is chosen from the group comprising of mica, glass and a polymer film the high thermal conductivity materials are chosen from the group consisting of silica, alumina, magnesium oxide, silicon carbide, boron nitride, aluminum nitride, zinc oxide and diamonds and dendrimers of approximately 1-1000 nm in size. These embodiments may be used independently or in combination.

In another embodiment the present invention provides for a high thermal conductivity coating on a surface of an electrically insulative tape comprised of an electrically insulative tape that is surface coated with a high thermal conductivity layer on at least one surface of the electrically insulative tape. The high thermal conductivity layer comprises at least one of a direct surface coating, a resinous layer loaded with high thermal conductivity materials, and a substrate layer. When the electrically insulative tape is lapped about an object in an overlapping manner, an interface is formed between layers of the electrically insulative tape, and the high thermal conductivity layer is continuous along the interface. The thermal conductivity of the high thermal conductivity layer is 1-100 W/mK, and where the rate of heat dissipation traveling between layers of the electrically insulative tape, and along the interface is increased by the high thermal conductivity layer.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for the surface coating of insulation tapes that are lapped around an object in a consistent manner such that the interface between the tape layers acts as a thermal conduit. The surface coating is of a high thermal conductivity (HTC) material that aids in the phonon transport along the interface.

In the prior art, heat had to dissipate directly through a layer of tape. Little heat would pass along the tape layer interface, and this location would in fact tend to trap heat as it passed between layers. The development of the present invention increases the heat flow at the interface; so that the entire system dissipates heat more efficiently.

The HTC material may be of a variety of types. Some embodiments include the general categories of a direct surface coating, an HTC loaded resinous coating or layer, and a substrate layer loaded with HTC materials. Specific details of each of these categories will be discussed below. In all embodiments is important that it has high enough resistivity and dielectric strength to ensure it does not effectively reduce groundwall electrical strength.

Figure 1:
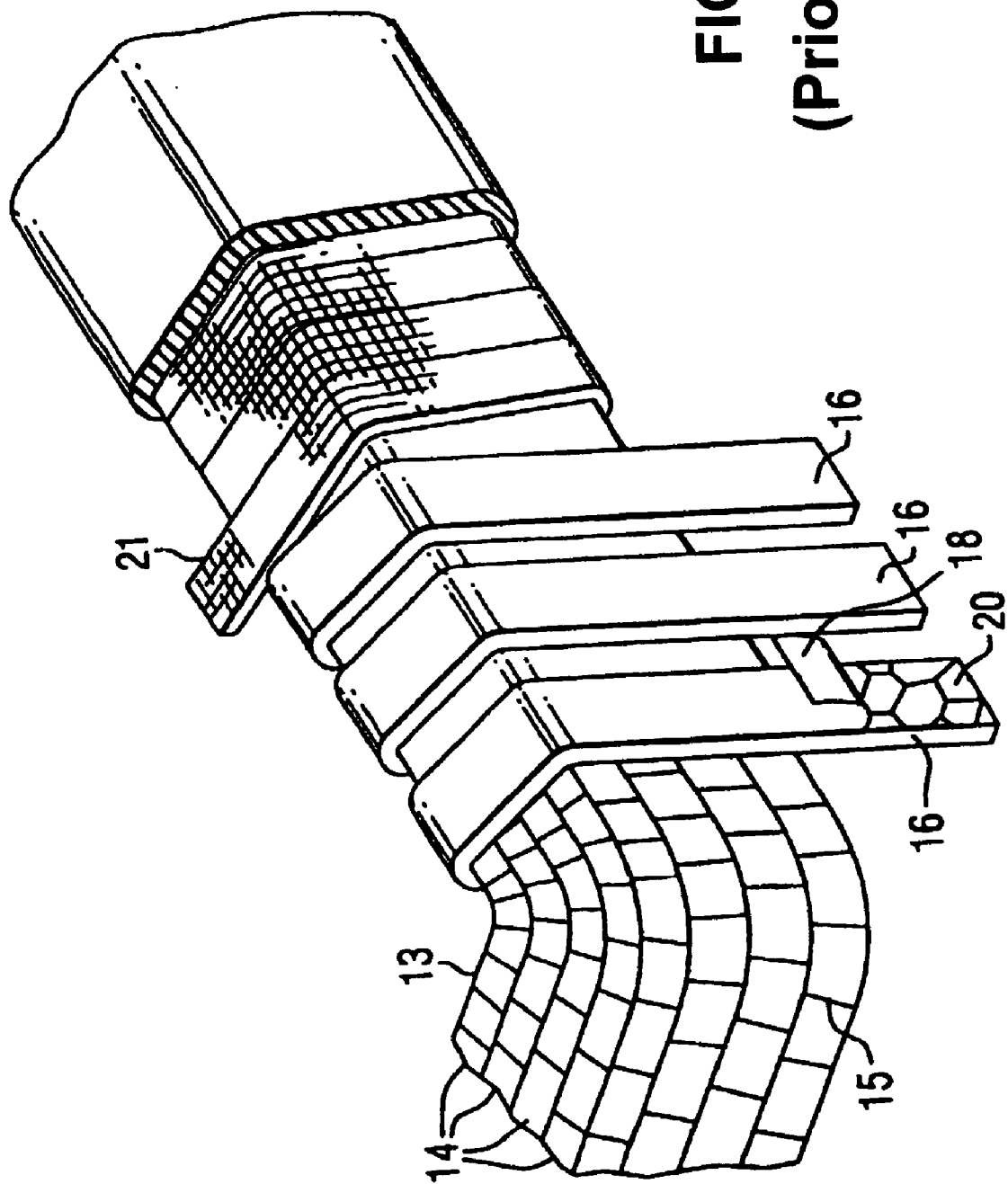
FIG. 1 shows the use of an insulating tape being lapped around a stator coil.
Figure 2:
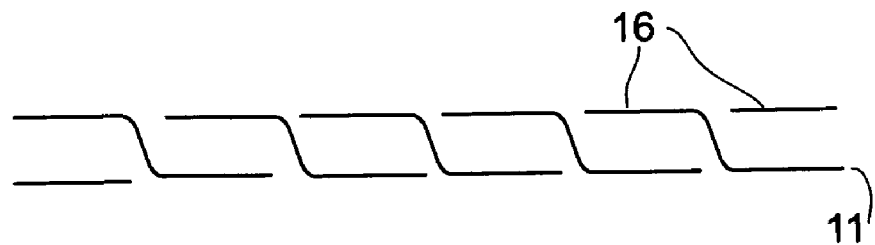
FIG. 2 illustrates a simplified cross sectional example of a half-lap tape application.
Figure 3:
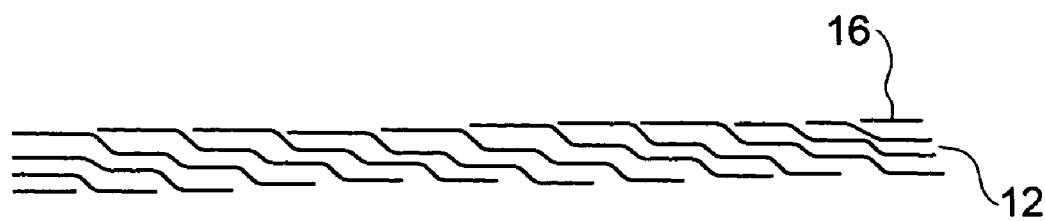
FIG. 3 illustrates a simplified cross sectional example of a double half-lap tape application.

Since the present invention improves the thermal conductivity of the interface between layers of tape, an overlap of the tape when applied to an object is preferred. Typical types of tape lapping include the half-lap and double half-lap applications, although the present invention is applicable to any type of overlapping tape. FIG. 2 illustrates a simplified cross sectional example of a half-lap tape application. FIG. 3 illustrates a similar cross section showing a double half-lap application. The tape 16 is layered partially over the previous layer 11, or layers 12. As is shown in FIGS. 2 and 3, eventually the layers form a uniform surface and the process may be repeated.

Figure 4:
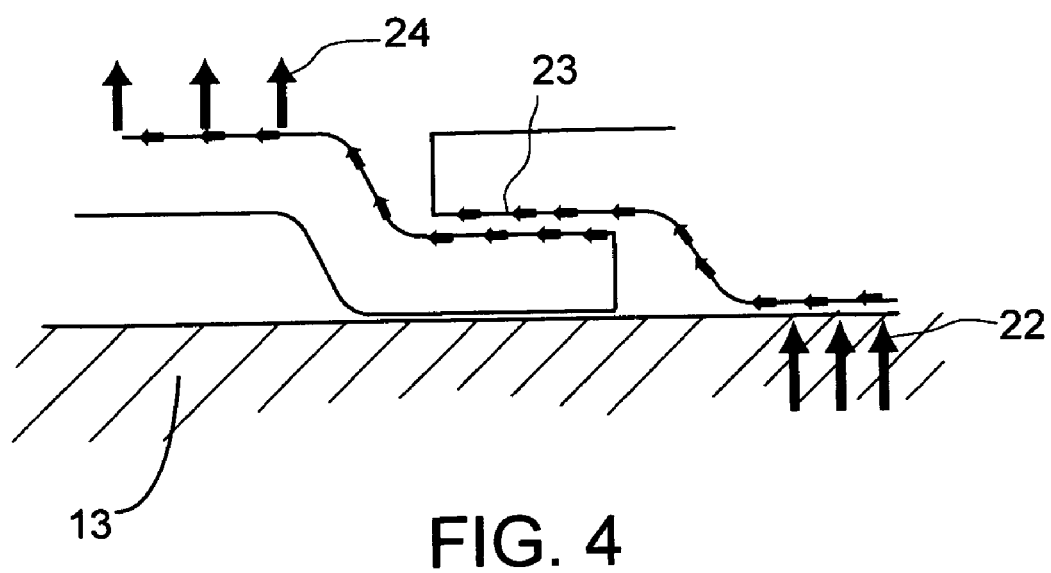
FIG. 4 illustrates the path of heat flow along the surface interface of lapped tapes according to one embodiment of the present invention.

Heat from the coils attempts to radiate outwards, but is insulated by the tape. The present invention improves the heat flow from the coils by providing an enhanced conduit at the interface between the tape layers. As illustrated in FIG. 4, heat 22 from a coil 13 is radiated outwards and into the insulating tape. In the prior art, the heat would then have to continue radiating in a perpendicular direction outward from the coil. However, in one embodiment of the present invention, the tape has been surface coated with a high thermal conductivity (HTC) material, so that the interface between the layers of tape 23 provides a pathway for the heat to reach the environment 24. Heat will continue to radiate through the tape layers, but the present invention increases the overall thermal dissipation of the system. The actual HTC coating is not shown in this figure as it would be too small to see on this scale.

In one embodiment of the present invention, the HTC material is coated on both surfaces of the tape. This not only aids in the conduction of heat at the interface as illustrated in FIG. 4, but also on the conduction of heat between tape layers. As heat radiates out of the top surface of a layer of tape, the abutting bottom surface of the next layer rapidly absorbs the heat. Since the tape is physically wound around an object, the layers of tape can only be held in relative intimacy with each other. In the prior art, this interface would slow down the thermal conductivity of phonons, since the phonon conduction slows as it transitions from one tape layer to the next. By providing a top and bottom HTC surface coating to the electrical insulation tape, phonons more rapidly conduct into the next layer of tape.

Figure 5:
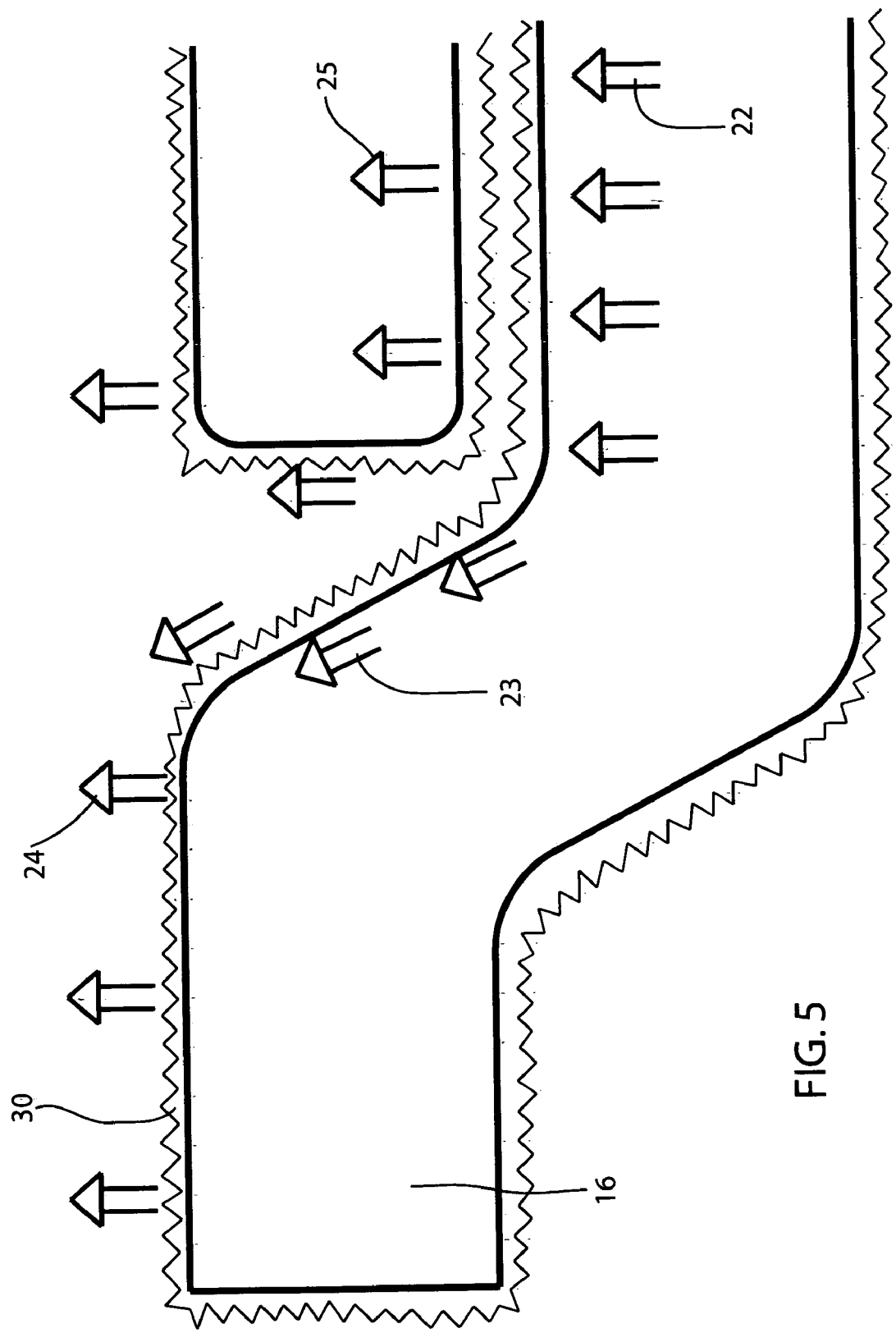
FIG. 5 illustrates a stylized close-up of a tape interface that has a DLC.

An example of this is illustrated in FIG. 5. In this embodiment tape 16 is surface coated with a diamond like coating (DLC) 30. Heat radiating from an object leaves a layer of tape on its top surface 22. Some of the heat then passes up the interface between the layers of tape 23, since the interface comprises two abutting HTC layers. Note that the coating of only one surface of the tape would still provide an interface conduit, but with less efficiency. Also the edges of the tape 16 are also coated, though these would be significantly thinner if shown to scale.

As the heat 22 radiates out of the tape and into the DLC, a percentage of the heat will be conducted to the abutting DLC coating and pass into the next layer of tape 25. Note that DLC shown in FIG. 5 is an exaggeration, since the DLC will usually be measured on the nanometer scale. To coat the sides of the tape, as is shown in FIG. 5, one of ordinary skill in the art would choose the direct surface coating or resinous coating approach, and not the loaded substrate layer.

As discussed earlier, electrical insulation tapes may comprise several distinct sub-layers. Examples given above include an electrically insulative layer, such as mica, and a strength layer, such as glass. Although the tapes tend to be impregnated with resins which helps to'homogenize the distinctive sub-layers, sub-interfaces can still exist. The present invention can therefore also be applied to the various surface sub-layers of a tape, thereby improving the thermal conductivity between the sub-layers. The coating of the sub-layer surface may be accomplished with the same materials mentioned and by the same processes, although the sub-layer surfaces will need to be coated prior to the tape being fully formed.

The various surface coatings can also impart improved or diminished physical properties to the tape. For example, the surface friction or tackiness of the tape can be enhanced by a resinous surface layer. This can reduce the slippage of the tape as it is being applied as well as during operation of a device. The change in qualities such as friction and tackiness will depend on the type of HTC material chosen. Although it is common practice to impregnate tapes with resin both before and after lapping, it is particular to this invention to surface coat the tapes before lapping.

The thermal conductivity of the surface coating will vary depending on the type of coating applied; however, the range of values is approximately 1-100 W/mK, with a more particular range of 40-80 W/mK. This will give bulk radial thermal conductivity of lapped tape values in the range of about 0.5-10 W/mK, with a more particular range of 1-8 W/mK, depending on the types of tapes used, and other factors, such as the impregnation of resins within the tape.

To directly surface coat the tape, there are a number of direct surface HTC coatings that embody the present invention, such as diamond like coatings (DLC) and various oxides, nitrides, carbides and mixed stoichiometric and non-stoichiometric combinations that can be applied to the host matrix. Examples of the oxides, nitrides and carbide include $Al_2O_3$, AlN, $MgO_2$, ZnO, BN, $Si_3N_4$, SiC and $SiO_2$. Other HTC coatings may also be apparent to one of ordinary skill in the art, and additional types of HTC coatings will likely be developed as the technology continues to progress.

To add the DLCs directly to the surface of insulating tapes, chemical vapor deposition and physical vapor deposition may be used in which the DLC is formed within a non-equilibrium radio frequency or microwave coupled vacuum or atmospheric plasma containing low molecular weight hydrocarbons such as methane, ethane and others with hydrogen. By controlling the gas mixture condition and the plasma operating conditions the thermal conductivity of the DLCs may be controlled by altering the hybridization state of the DLC which may be controlled by changing the balance of $sp^2$ and $sp^3$ electron orbital bonding states. The bonding states may be measured using Raman spectroscopy and X-ray photoelectron spectroscopy. The case of vacuum plasma deposition batch processing may be achieved and in the case of atmospheric plasma deposition continuous processing may be used.

The thickness of the DLC on the tape surface can be varied depending on the application. Most embodiments, however, will use a 20-200 nm thickness, with a particular thickness of 50-100 nm thickness coating over the average surface of the matrix. The process of chemical vapor deposition will inherently deposit a thicker coating on exposed surfaces, and volumes of the matrix that are closer to the exposed surfaces. This may be adjusted for by those of ordinary skill in art.

Diamond-Like Carbon Coatings (DLC) have high hardness, low friction, chemical inertness, and can combine high electrical resistivity (~$10^{13}$ Ohm cm) for electrical insulation with high thermal conductivity (>1000 W/mK). There are several methods for producing a DLC, such as plasma assisted chemical vapor deposition (PACVD), physical vapor deposition (PVD), and ion beam deposition (IBD). In general, the DLC is less than one micron thick and is of amorphous carbon and hydrocarbons which results in mixed $sp^2$ and $sp^3$ bonds. The bond ratio can be varied by varying the process parameters, for example the ratio of gases, the plasma energy, and DC voltage, with resultant changes in properties. The bond ratio can be directly measured using, for example, Raman spectroscopy.

Relatively large areas can be coated quite quickly. For example using a PACVD low pressure non-equilibrium process, a 20-100 nm coating can be applied to a glass cloth surface approximately 1 sq ft in area in minutes. To control or optimize the coating parameters to reduce, for example, the stress in the coating, the DLC can be applied to a bare substrate or substrates that have other coatings. In part due to the thinness of the DLC coating, this type of surface coating is easily used in addition to the other types of surface coatings discussed below.

The tape surface may also be coated with a thin resin layer that is loaded with HTC materials. The terms coating and layer are used somewhat interchangeably when referring to the surface coating of the present invention, since coatings can be seen as forming the outermost layer of the tape. The thickness of the resinous layer is from about 0.05-1.0 mils. The layer can be applied by a variety of methods, such as roller coating or spray coating, as well as other techniques such as roller methods, knife edge or gate edge and others.

As used herein, the term resin refers to all resins and epoxy resins, including but not limited to modified and hybrid epoxies, polyesters, polyurethanes, polyimides, polyesterimides, polyetherimides, bismaleimides, silicones, polysiloxanes, polybutadienes, cyanate esters, hydrocarbons etc. as well as homogeneous blends of these resins. This definition of resins includes additives such as cross-linking agents, accelerators and other catalysts and processing aids. Certain resins, such as liquid crystal thermosets (LCT) and 1, 2 vinyl polybutadiene combine low molecular weights characteristics with good cross-linking properties.

The HTC materials loaded into the resins are of a variety of substances that can be added so that they may physically and/or chemically interact with or react with the resins to improve thermal conductivity. In one embodiment, the HTC materials are dendrimers and other core-shell chemistries, and in another embodiment they are nano or micro inorganic fillers having a defined size or shape including high aspect ratio particles with aspect ratios (ratio mean lateral dimension to mean longitudinal dimension) of 3 to 100 or more, with a more particular range of 10-50.

In a related embodiment, the HTC materials may have a defined size and shape distribution. In both cases the concentration and relative concentration of the filler particles is chosen to enable a bulk connecting (or so-called percolation) structure to be achieved which confers high thermal conductivity with and without volume filling to achieve a structurally stable, discrete two-phase composite with enhanced thermal conductivity. In another related embodiment, the orientation of the HTC materials increases thermal conductivity. In still another embodiment, the surface coating of the HTC materials enhances phonon transport. These embodiments may stand apart from other embodiments, or be integrally related. For example, dendrimers are combined with other types of highly structured materials such as thermoset, thermoplastic materials and liquid crystal systems. They are uniformly distributed through a resin matrix such that the HTC materials reduce phonon scattering and provide micro-scale bridges for phonons to produce good thermally conducting interfaces between the HTC materials. The highly structured materials are aligned so that thermal conductivity is increased along a single direction or directions to produce either localized or bulk anisotropic electrically insulating materials. In another embodiment, HTC is achieved by the surface coating of lower thermal conductivity fillers. The lower thermal conductivity fillers contain metal oxides, carbides or nitrides and mixed systems having high thermal conductivity which are physically or chemically attached to fillers having defined bulk properties. This attachment is achieved by processes such as chemical vapor deposition and physical vapor deposition and also by plasma treatment.

In related embodiments, the HTC materials form essentially homogenous mixtures with the resins, essentially free of undesired microscopic interfaces, variable particle wetting and micro void formation. These homogeneous materials form a continuous-phase material which are non-discrete at length scales shorter than either the phonon wavelength or phonon mean free path in conventional electrical insulating materials.

In all cases phonon transport is enhanced and phonon scattering reduced by ensuring that the length scales of the structural elements are shorter than or commensurate with the phonon distribution responsible for thermal transport. Larger HTC particulate materials can actually increase phonon transport in their own right; however, smaller HTC materials can alter the nature of the resin matrix, thereby affecting a change on the phonon scattering. This may be further assisted by using nano-particles whose matrices are known to exhibit high thermal conductivity and to ensure that the particle size is sufficient to sustain this effect and also to satisfy the length scale requirements for reduced phonon scattering.

Continuous two-phase organic-inorganic hybrids may be formed by incorporating inorganic nano-particles in linear or cross-linked polymers and thermosetting resins in which nano-particles dimensions are of the order of or less than the polymer or network segmental length (typically 1 to 50 nm). This would include, but is not exclusive to, three routes or mechanisms by which this can occur: (i) side chain grafting; (ii) inclusive grafting e.g. between two polymer chain ends and; (iii) cross linking grafting involving several polymer molecules. These inorganic nano-particles will contain reactive surfaces to form intimate covalently bonded hybrid organic-inorganic homogeneous materials. These nano-particles may be one of the following: alumina, magnesium oxide, zinc oxide and other metal oxides, boron nitride and aluminium nitride and other metal nitrides, silicon carbide and other carbides, diamond of natural or synthetic origin, any of the various physical forms of each type, and other metal carbides and hybrid stoichiometric and non-stoichiometric mixed oxides, nitrides and carbides. Further, these nano-particles will be surface treated to introduce a variety of surface functional groups which are capable of participating in reactions with the host organic polymer or network. The volume percentage of the HTC materials in the resin may be up to approximately 60% or more by volume, and more particularly up to approximately 35% by volume. Higher volume filling tends to give higher structural stability to a matrix. However, with control of the size and shape distribution, degree of particle association and alignment the HTC materials can occupy as little as 1% by volume or less. Although, for structural stability reasons, it might be useful to add an amount greater than the minimum needed for percolation to occur. Therefore the resin can withstand physical strains and deformation without damaging the percolation structure and the HTC characteristics, which is particularly important for resinous surface coatings.

In many embodiments, the size and shape of the HTC materials are varied within the same use. Ranges of size and shape are used in the same product. A variety of long and shorter variable aspect ratio HTC materials will enhance the thermal conductivity of a resin matrix, as well as potentially provide enhanced physical properties and performance. One aspect that should be observed, however, is that the particle length does not get so long as to cause to the insulating properties. Also, a variety of shapes and length will improve the percolation stability of the HTC materials by providing a more uniform volume filing and packing density which results in a more homogeneous matrix. When mixing size and shapes, in one embodiment, the longer particles are more rod-shaped, while the smaller particles are more spheroidal, platelet or discoid and even cuboids. For example, a resin containing HTC materials could contain about 55-65% by volume for 10-50 nm diameter spheroids and about 15-25% by volume for 10-50 μm length rods, with 10-30% volume resin.

In regards to shape, the present invention utilizes shapes tending towards natural rods and platelets for enhanced percolation, with rods being the most preferred embodiment including synthetically processed materials as well as those naturally formed. A rod is defined as a particle with a mean aspect ratio of approximately 5 or greater, with particular embodiments of 10 or greater, though with more particular embodiments of no greater than 100. In one embodiment, the axial length of the rods is approximately in the range 10 nm to 100 microns. Smaller rods will percolate a resin matrix better, and have less adverse effect on the viscosity of the resin.

Many micro particles form spheroidal and discoid shapes, which have a reduced ability to distribute evenly under certain conditions and so may lead to aggregated filamentary structures that reduce the concentration at which percolation occurs. By increasing the percolation, the thermal properties of the epoxy resin can be increased, or alternately, the amount of HTC material that needs to be added to the epoxy resin can be reduced. Also, the enhanced percolation results in a more even distribution of the HTC materials within the epoxy resin rather than agglomeration which is to be avoided, creating a more homogenous product that is less likely to have undesired interfaces, incomplete particle wetting and micro-void formation. Likewise aggregated filamentary or dendritic structures, rather than globular (dense) aggregates or agglomerates, formed from higher aspect ratio particles confer enhanced thermal conductivity.

Reactive surface functional groups may be formed from surface groups intrinsic to the inorganic coating or may be achieved by applying additional organic coatings both of which may include hydroxyl, carboxylic, amine, epoxide, silane, vinyl and other groups which will be available for chemical reaction with the host organic matrix. These single or multiple surface coatings and the surface functional groups may be applied using one of the following methods: wet chemical methods; non-equilibrium plasma methods including plasma polymerization and chemical vapor and physical vapor deposition; and sputter ion plating and electron and ion beam evaporation methods.

The third type of coating that can be applied to the tape surface are substrates loaded with HTC particles. The types of substrates are typically those used as tape layers, such as mica, glass and films such as polymers and polyamides. The HTC materials are interdispersed into the substrate. The thickness of these coatings are generally on the order of one mil. Resins, such as the resins described above, may also be impregnated into this thin substrate layer. Such layers may be commercially available as a film.

The HTC materials are comprised predominately of fillers of nano, meso and micro size in various combinations, which may have a DLC directly thereon. The nanofillers comprise 0.1-65% by volume of the HTC substrate, and in a further particular embodiment the nanofillers comprise 1-25% by volume of the HTC substrate. The nanofillers are a category of materials that, in many cases, have the same as HTC materials loaded in the resinous coating as described above.

Nanofillers have dimensions of about 1-1000 nm, so in fact may also be meso and micro fillers. These may be spherical, platelets or have a high aspect ratio such as whiskers, rods or nanotubes, and their related assembled forms may be aggregates, fibrillar dendrites, ropes, bundles and nets, and other forms. In addition, the nanofillers may have their own coatings, such as diamond like coatings (DLC) and various oxides, nitrides, carbides and mixed stoichiometric and non-stoichiometric combinations that can be applied to the host matrix. It is possible to combine nanofillers, such as a combination of nano, meso or micro spheres and rods, with a DLC or oxide coating on nano, meso or micro particulates. It is also important to note that there may be diamond nanofillers of various forms, which are distinct from diamond like coatings. These types of coatings may also be used for the HTC materials loaded in the resins that are used for resinous coatings as described above.

The nanofiller materials comprise nano, meso, and micro inorganic HTC-materials such as silica, alumina, magnesium oxide, silicon carbide, boron nitride, aluminium nitride, zinc oxide and diamond, as well as others, which give higher thermal conductivity. These materials can have a variety of crystallographic and morphological forms and they may be processed with the host matrix either directly or via a solvent, or in a liquid resin system, which acts as a carrier liquid. Solvents or low viscosity resin systems may be the preferred delivery system when the HTC-materials are delivered by coating or impregnation process.

In one embodiment, the nanofillers are dendrimers. In another embodiment they are nano, meso or micro inorganic fillers having a defined size or shape including high aspect ratio particles with aspect ratios (ratio mean lateral dimension to mean longitudinal dimension) of 3 to 100 or more, with a more particular range of 10-50.

In regards to shape, the present invention utilizes shapes tending towards natural rods and platelets for enhanced percolation in the host matrix with rods being the most preferred embodiment including synthetically processed materials in addition to those naturally formed. A rod is defined as a particle with a mean aspect ratio of approximately 5 or greater, with particular embodiments of 10 or greater, though with more particular embodiments of no greater than 100. In one embodiment, the axial length of the rods is approximately in the range 10 nm to 100 microns. Smaller rods will percolate a host matrix better when added to a finished host matrix using a solvent.

In one embodiment the present invention provides for an insulation tape lapped around an electrical object that comprises an insulation tape that is surface coated with a high thermal conductivity layer. At least a top and bottom surface of the tape are coated, however, in particular embodiments, the top, bottom and side surfaces of the tape are coated. Side surface coating is a particular embodiment when tapes are lapped in an overlapping manner. An electrical object is lapped by the insulation tape, where the insulation tape provides electrical insulation to the electrical object, where the electrical object produces heat. This heat travels through the insulation tape to the interface between the layers of tape. Then, the high thermal conductivity layer acts to rapidly disperse heat along the interface and into the next lap. This would include heat transfer both in-plane and normal to the plane.

In a related embodiment, the conductivity of the high thermal conductivity layer is 1-100 W/mK, with a more particular range of 40-80 W/mK. The radial thermal conductivity of the insulation tape is lapped around the electrical object is 0.5-10 W/mk, with a more particular range of 1-8 W/mk.

In some embodiments the high thermal conductivity layer is a direct surface coating of approximately 20-200 nm in thickness. The direct surface coating may be a diamond like coating, or at least one of $Al_2O_3$, AlN, $MgO_2$, ZnO, BN, $Si_3N_4$, SiC and $SiO_2$ with mixed stoichiometric and non-stoichiometric combinations. In other embodiments, the high thermal conductivity layer is a resinous coating of approximately 0.05-1.0 mils. In still other embodiments, the high thermal conductivity layer is a thin substrate layer loaded with high thermal conductivity materials and is approximately 0.5-3.0 mils in thickness. The substrate layer is chosen from the group comprising of mica, glass and a polymer film and the high thermal conductivity materials are chosen form the group consisting of silica, alumina, magnesium oxide, silicon carbide, boron nitride, aluminum nitride, zinc oxide and diamonds and dendrimers of approximately 1-1000 nm in size. These embodiments may be used independently or in combination.

In another embodiment the present invention provides for a high thermal conductivity coating on a surface of an electrically insulative tape that comprises an electrically insulative tape that is surface coated with a high thermal conductivity layer on at least one surface of the electrically insulative tape. The high thermal conductivity layer comprises at least one of a direct surface coating, a resinous layer loaded with high thermal conductivity materials, and a substrate layer. When the electrically insulative tape is lapped about an object in an overlapping manner, an interface is formed between layers of the electrically insulative tape, and the high thermal conductivity layer is continuous along the interface. The thermal conductivity of the high thermal conductivity layer is 1-100 W/mK where the rate of heat dissipation traveling between layers of the electrically insulative tape and along the interface is increased by the high thermal conductivity layer.

In some embodiments resins impregnated into the tape will come between the tape layers, and therefore the interface mentioned above may further comprise an additional layer of resin. This resin layer may be continuous or semi-continuous. To obtain a semi-continuous layer, this may be accomplished by a variety of techniques, such as regulating the pressure at which the resin is impregnated. Another technique for forming a semi-continuous layer of resin at the interface is to use tapes that are semi-impregnable to resins at the interface. This will allow for a more controlled distribution of a resinous layer at the interface.

In another embodiment the present invention provides for an electrically insulative tape lapped around an electrical object that comprises a high thermal conductivity coating surface coated on the tape, where at least a top surface and a bottom surface of the tape are coated. The tape is lapped around the electrical object such that at least one quarter of the tape is lapped by a next layer of the tape, and where the contact between layers of the tape forms an interface. The interface is substantially uniformly made up of the high thermal conductivity coating on the surfaces of the tape, and the high thermal conductivity coating comprises at least one of $Al_2O_3$, AlN, $MgO_2$, ZnO, BN, $Si_3N_4$, SiC and $SiO_2$ with mixed stoichiometric and non-stoichiometric combinations, and where the thermal conductivity of the high thermal conductivity layer is 1-100 W/mK.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. An insulation tape lapped around an electrical object comprising:

an insulation tape that is surface coated with a high thermal conductivity layer, wherein said high thermal conductivity layer is coated on at least a top surface, a bottom surface, and a side surface of said insulation tape;

an electrical object lapped by said insulation tape, wherein said insulation tape provides electrical insulation to said electrical object, and wherein said electrical object produces heat;

wherein the lapping of said insulation tape form an overlap such that a portion of a top surface of said tape in a first lap is contacted by at least a portion of a bottom surface of said tape in a next lap forming an interface between said first lap and said next lap;

wherein heat from said electrical object travels through said insulation tape to said interface, and wherein said high thermal conductivity layer acts to rapidly disperse heat along said interface and to said next lap.

2. The insulation tape of claim 1, wherein the conductivity of said high thermal conductivity layer is 1-100 W/mK.

3. The insulation tape of claim 2, wherein the thermal conductivity of said high thermal conductivity layer is 40-80 W/mK.

4. The insulation tape of claim 1, wherein the radial thermal conductivity of said insulation tape is lapped around said electrical object is 0.5-10 W/mk.

5. The insulation tape of claim 4, wherein the radial conductivity of said insulation tape lapped around said electrical object is 1-8 W/mk.

6. The insulation tape of claim 1, wherein said high thermal conductivity layer is a direct surface coating approximately 20-200 nm in thickness.

7. The insulation tape of claim 6, wherein said direct surface coating is a diamond like coating.

8. The insulation tape of claim 6, wherein said direct surface coating is at least one of $Al_2O_3$, AlN, $MgO_2$, ZnO, BN, $Si_3N_4$, SiC and $SiO_2$ with mixed stoichiometric and non-stoichiometric combinations.

9. The insulation tape of claim 1, wherein said high thermal conductivity layer is a resinous coating of is approximately 0.05-1.0 mils, and wherein said resinous coating is loaded with high thermal conductivity having aspect ratios of approximately of 3 to 100.

10. The insulation tape of claim 1 wherein said high thermal conductivity layer is a thin substrate layer loaded with high thermal conductivity materials and is approximately 0.5-3.0 mils in thickness.

11. The insulation tape of claim 10, wherein said substrate layer is chosen from the group comprising of mica, glass and a polymer film and wherein said high thermal conductivity materials are chosen from the group consisting of silica, alumina, magnesium oxide, silicon carbide, boron nitride, aluminum nitride, zinc oxide and diamonds and dendrimers of approximately 1-1000 nm in size.

12. The insulation tape of claim 1, wherein the lapping of said insulation tape on said electrical object is lapped in at least one of a half-lap and a double half-lap manner.

13. A high thermal conductivity coating on a surface of an electrically insulative tape comprising:

an electrically insulative tape that is surface coated with a high thermal conductivity layer on at least one surface of said electrically insulative tape;

wherein said high thermal conductivity layer comprises at least one of a direct surface coating, a resinous layer loaded with high thermal conductivity materials, and a substrate layer;

wherein when said electrically insulative tape is lapped about an object in an overlapping manner so that an interface is formed between layers of said electrically insulative tape, and wherein said high thermal conductivity layer is continuous along said interface;

wherein the thermal conductivity of said high thermal conductivity layer is 1-100 W/mK, and wherein the rare of heat dissipation traveling between layers of said electrically insulative tape, and along the interface is increased by said high thermal conductivity layer;

wherein said high thermal conductivity layer is a direct surface coating approximately 20-200 nm in thickness.

14. The high thermal conductivity coating of claim 13, wherein said high thermal conductivity layer is coated on at least one of a top surface, and a bottom surface of said electrically insulative tape.

15. The high thermal conductivity coating of claim 14, wherein high thermal conductivity layer is coated on a top surface, a bottom surface and lengthwise side surfaces.

16. The high thermal conductivity coating of claim 13, wherein said direct surface coating is a diamond like coating.

17. The high thermal conductivity coating of claim 16, wherein said direct surface coating is at least one of $Al_2O_3$, AlN, $MgO_2$, ZnO, BN, $Si_3N_4$, SiC and $SiO_2$ with mixed stoichiometric and non-stoichiometric combinations.

18. The high thermal conductivity coating of claim 13, wherein said resinous coating is loaded with high thermal conductivity materials chosen from the group consisting of silica, alumina, magnesium oxide, silicon carbide, boron nitride, aluminum nitride, zinc oxide and diamonds and dendrimers of approximately 1-1000 nm in size 19. The high thermal conductivity coating of claim 13, wherein said substrate layer is chosen from the group comprising of mica, glass and a polymer film and wherein said high thermal conductivity materials are chosen from the group consisting of silica, alumina, magnesium oxide, silicon carbide, boron nitride, aluminum nitride, zinc oxide and diamonds and dendrimers of approximately 1-1000 nm in size 20. An electrically insulative tape lapped around an electrical object comprising:

a high thermal conductivity coating surface coated on said tape, wherein at least a top surface and a bottom surface of said tape are coated;

wherein said tape is lapped around said electrical object such that at least one quarter of said tape is lapped by a next layer of said tape, and wherein the contact between layers of said tape forms an interface;

wherein said interface is substantially uniformly made up of said high thermal conductivity coating on the surfaces of said tape;

wherein-said high thermal conductivity coating comprises at least one of $Al_2O_3$, AlN, $MgO_2$, ZnO, BN, $Si_3N_4$, SiC and $SiO_2$ with mixed stoichiometric and non-stoichiometric combinations;

wherein the thermal conductivity of said high thermal conductivity layer is 1-100 W/mK;

wherein said high thermal conductivity layer is a direct surface coating approximately 20-200 nm in thickness.

21. The tape of claim 20, wherein said tape is partially impregnable to resins at the interface.

* * * * *